Patented Oct. 1, 1940

2,216,173

UNITED STATES PATENT OFFICE 2,216,173

PRODUCT AND PROCESS FOR ITS PRODUCTION

John D. Guthrie, Yonkers, N. Y., assignor to Standard Brands Incorporated, New York, N. Y., a corporation of Delaware No Drawing. Application June 26, 1937, Serial No. 150,537

19 Claims. (Cl. 99—232)

The invention relates to a product having marked bleaching action upon carotin coloring matter, and a process for its preparation. More particularly, it is concerned with the production of a concentrated carotin bleaching material obtained from legumes, a process for its preparation from soy beans, and the like, and a procedure for its utilization in the manufacture of baked goods, and includes correlated improvements and discoveries whereby the decolorization of carotin is enhanced.

An object of the invention is to provide a material having distinctive potency for the bleaching or decolorization of carotin coloring matter.

A further object of the invention is the provision of a carotin decolorizing material having a potency several times that of a legume flour, for example, soy bean flour.

Another object of the invention is to provide a carotin decolorizing material which may be used efficaciously for the manufacture of baked goods, especially bread, having an improved interior color or whiter crumb.

An additional object of the invention is to provide a process for the preparation of a carotin decolorizing material of high activity from legumes, which may be carried out effectively, economically and readily under commercial production.

A more specific object of the invention is the provision of a procedure for the manufacture of baked goods of improved interior color, which entails utilization of a concentrated carotin decolorizing material.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention a concentrated carotin decolorizing material may be prepared by the extraction of a legume, for example, soy bean, black-eyed cow peas, lupine seeds, and the like, preferably in the form of a flour, by a treatment initially of the legume flour with a solvent, particularly an aqueous solvent, and specifically water. If it is desired to reduce the amount of dry matter contained in the extract the solvent may be acidulated. Thus, there may be utilized a dilute solution of an inorganic acid, such as hydrochloric, sulfuric, phosphoric. Moreover, the amount of acid added may be such as will give a pH value to the extract which lies between 5.2 and 5.9.

The advantage of the use of an acidulated solvent is two-fold inasmuch as the amount of active material extracted is equal to that extracted by water alone, but only about one-half as much dry matter is extracted. This, of course, accomplishes also a purification of the active material, and the extract, because of a lower dry matter content, will possess a raw bean flavor to a considerably lesser amount. Satisfactory results have been obtained when the amount of acid used is such as to yield an extract having a pH value of 5.5.

The extract thus obtained may then be brought to a pH value of 6.5 to 7 through the addition of a dilute alkali such as sodium hydroxide, potassium hydroxide, the corresponding carbonates and the like, and thereupon a precipitation is effected through the addition to the solution, suitably to the saturation point, of a precipitant, preferably a salt, as ammonium sulfate, or it may be an organic liquid, as acetone. The solution is now permitted to stand for several hours, e. g., overnight in a refrigerator, and a precipitate of active carotin decolorizing material is obtained and separated from the liquid by filtration, which may be assisted by using suction. There results a rather friable precipitate which is dissolved in water and the solution dialyzed in running water through a collodion membrane, whereby the ammonium sulfate is removed by passage through the membrane, but the active material is retained within. Following dialysis the solution is evaporated to dryness, desirably under vacuum, and at a temperature of 40° C. or less. Thereby a brittle crystalline-like substance is obained having a carotin decolorizing activity, which is about five times that of the same weight of soy bean flour. The active material consequently is about five times as potent as the soy bean flour.

As illustrative examples of a manner in which the carotin decolorizing material may be produced, the following examples are presented:

*Example I*

50 grams of soy bean flour may be ground in a mortar with 70 cc. of N/10 hydrochloric acid and 430 cc. of water. This mixture is then centrifuged and a fatty layer which separates is removed and discarded. The remainder of the supernatant liquid having a volume of 390 cc. is utilized, and it has a pH value of about 5.56, which value is raised to about 7.0 through the addition of about 43 cc. of N/10 sodium hydroxide. To the solution thus obtained there is now added about 303 grams of ammonium sulfate, which should be sufficient to produce a saturated solution. After standing in a refrigerator overnight, the precipitate which is formed may be separated from the liquid by filtering through a hardened filter paper in a Büchner funnel using suction.

The precipitate is dissolved in about 50 cc. of water and dialyzed for two and one-half hours in a collodion bag with running water. The volume of the solution following dialysis has increased to about 115 cc., and it may be evaporated to a small volume by allowing it to drip slowly over an evacuated spiral coil (spiral condenser) jacketed with water at about 40° C. When concentrated it is placed in a vacuum dessicator over sulfuric acid and permitted to remain therein until it is dry.

Further, the solution obtained, following dialysis, may be completely evaporated to dryness under vacuum at a temperature of 40° C. or less. The residue obtained is brittle, crystalline-like in appearance, and the amount obtained was 2½ grams. This was found to be five times as potent or active for the bleaching of carotin coloring matter as the soy bean flour from which it was prepared. Moreover, the concentrated material was also found to be about five times as effective as the soy bean flour for the production of bread having an improved interior color or whiter crumb. The dried material retains its activity for a few weeks when stored in air at room temperature. The activity was maintained indefinitely when stored in vacuo or at a temperature of —7° C.

Example II 40 grams of black-eyed cow peas may be ground to a 40 mesh size and mixed with about 32 cc. of N/10 hydrochloric acid dissolved in 368 cc. of water. This mixture is then centrifuged, and the supernatant liquid separated has a pH value of about 5.7 and a volume of about 305 cc. Through the addition of about 17 cc. of N/10 sodium hydroxide, the pH value is raised to about 6.7, and thereto 204 grams of ammonium sulfate may be added which should be sufficient to saturate the solution. After standing in a refrigerator overnight, the precipitate which has formed may be filtered out with the aid of suction, then dissolved in about 25 cc. of water and dialyzed against running water for two and one-half hours. The volume increases to about 53 cc., and upon evaporation under vacuum at about 40° C. there was obtained 600 mg. of active material having about twelve times the potency for the decolorization of carotin, as soy bean flour, or the cow pea material from which it was prepared.

Furthermore, the precipitate obtained, following the addition of ammonium sulfate, may be dried in air, and such material has a carotin decolorizing potency which is about five times that of soy bean flour. The difference in potency is to be attributed in all likelihood to the ammonium sulfate contained along with the active material. Such a combination in itself is found to be desirable in the production of a bread having improved color, since in addition to the decolorizing effect there is thus provided a yeast assimilable nitrogen containing nutriment. In addition, the active material with ammonium sulfate may have admixed therewith a starch, thus forming a composition adapted for improvement in the qualities of baked products, especially bread. Such an improver composition may also contain an innocuous calcium salt, such as acid calcium phosphate and calcium sulfate, and an innocuous oxidizing salt, e. g., a chlorate, iodate, bromate, persulfate, percarbonate, and the like.

Example III

An extract of soy flour may be prepared by grinding with water in a mortar in the proportion of about 100 cc. of water for each 10 grams of soy bean flour. This mixture is centrifuged, the fatty layer which separates removed by skimming, and the middle aqueous layer withdrawn by decantation. To this aqueous layer there is added an organic liquid as a precipitant, specifically acetone, in an amount which is about four times the volume of the aqueous layer. A precipitate forms and after it has settled it may be removed by filtration through a hardened filter paper in a Büchner funnel using suction. A pure product may be obtained through a washing of the precipitate with acetone, following which it may be dried in a vacuum dessicator over sulfuric acid. The yield is about 4.2 grams for each 100 cc. of extract, and the material is characterized by a potency several times that of the soy bean flour from which it was prepared.

Instead of the ammonium sulfate used to saturate the solutions in Examples I and II, magnesium sulfate may be used in like manner. However, the precipitate which is formed is not as readily removed by filtration as is the ammonium sulfate precipitate, and the yield is somewhat smaller. It has been found that in addition to the soy bean and black-eyed cow peas other legumes may be used, and mention may particularly be made of the following: *Dolichos lablab* seeds, *Plaseolus metcalfei* seeds, *Vicia faba* seeds, Lupine seeds, Mexican beans, regina beans, lima beans, caneli beans, peas, lentils, pea beans.

It is my belief that the bleaching of carotin coloring matter by material contained in soy bean and other legumes is to be attributed to at least two components, the first component, which may be designated as A and which is destroyed by boiling, may be prepared by adding a precipitant to a water extract of a legume flour, filtering out the precipitate and washing it for purification. The second component, which may be designated B, is not destroyed by boiling and may be prepared by extracting a legume flour with acetone of about 80% strength, removing the acetone by evaporation, preferably at room temperature in a stream of air, and then dissolving the residue in water. The action of components A and B was tested with respect to carotin coloring matter in the form of a hydrosol obtained by adding an acetone solution of carotin to water, or other aqueous medium. It was found that neither component A nor component B possess bleaching action when utilized separately, but when they are combined they evidence a strong bleaching effect.

However, when carotin coloring material was dissolved in a vegetable oil, as olive oil, cottonseed oil or wheat oil, and an emulsion thereof used, component A alone showed bleaching action, and its activity was not increased by adding component B. On the other hand, component B alone had no bleaching effect. These results, it is believed, indicate that component B was supplied by the vegetable oils in quantity sufficient to activate component A. Tests in the baking of bread showed that the use of component A alone produced a loaf having improved interior color and whiter crumb, while there was no such improvement through the sole addition of component B. This indicates that the flour supplied component B and also that the carotin coloring matter may be present in the flour in solution in oil or fat.

From all of which it appears that the effective bleaching agent in the legumes, as soy, is component A, and that the bleaching effect of component A is activated by component B. Further, various natural products, as vegetable oil, wheat flour, and the like, possess component B in sufficient quantity to activate component A, and hence in the production of baked products, as bread, the introduction of component A is necessary to yield a whiter crumb, but an additional amount of component B is not required. Component A, therefore, is the active material for the decolorization of carotin coloring matter, and component B plays the role of an activator.

The foregoing procedures lead to the preparation of an active and highly potent agent whereby carotin coloring matter may be decolorized. These preparations may be from five to twelve times as active as the same weight of soy flour, and consequently possess the marked advantage that the same amount of bleaching or decolorizing of carotin coloring matter may be effected with less material, and hence with less danger of imparting an undesirable color and/or taste to the finished product. Thus, a concentrated material having five times the potency of soy bean flour could be added to a dough batch in an amount which is only one-fifth of that which would be required if soy bean flour were employed. Accordingly, in the event that from 0.3 to ½% of soy bean flour were being used in the preparation of a dough batch, there would be required only one-fifth of this amount when using the concentrated material prepared from soy bean flour in accordance with the method set forth herein. Moreover, the concentrated material retains its activity for a considerable period of time under the usual temperature and pressure conditions, and its activity may be retained indefinitely when stored in vacuo, or maintained at a temperature of about −7° C.

The invention is attended by the following features: a legume flour, as soy bean, contains two components which enter into the decolorization of carotin coloring matter, a component A which is destroyed by boiling, and a component B which is not destroyed by boiling and has the properties of an activator; neither component passes a collodion membrane; component A is present in the seeds of many and various legumes, and component B, in addition to its presence in legumes, is found also in vegetable lecithin, egg lecithin, vegetable oils, an ether extract of wheat flour, and in grain beetles; the effect of the active material is produced through the conjoint action of oxygen; and, such effect is not inhibited by the presence of extraneous materials, as cyanides.

Production of an improved interior color in bread requires only the introduction of component A inasmuch as it appears that component B is present in solution in the oil or fat of the flour. The manufacture of baked goods is carried out by introducing the concentrated material into a dough batch, and subsequently shaping and baking. If the dough batch does not contain any, or an insufficient amount of, component B, it likewise is added thereto. In the production of bread the concentrated material is incorporated into a dough batch containing flour, water, yeast, and other dough ingredients, forming the batch into a dough, and subsequently baking. When the yellow pigments of wheat flour were extracted by means of ether, and treated with component A, they were completely decolorized without the addition of component B, thereby evidencing the presence of the B component in the oil extracted by the ether. An active material containing component A and being at least five times as potent as soy bean flour may be prepared from the soy bean by the methods herein given, and a similar product produced from the cow pea possessed an activity about twelve times that of soy flour.

Since certain changes in carrying out the above process and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the preparation of a concentrated carotin decolorizing material, which comprises treating a legume with an aqueous solvent, separating solid and liquid, adding a carotin decolorizing material precipitant belonging to the group consisting of ammonium sulfate and magnesium sulfate whereby a precipitate of active material is obtained, separating the active material so produced from the liquid, and drying at a low temperature.

2. A process for the preparation of a concentrated carotin decolorizing material, which comprises treating a legume with acidulated water, separating solid and liquid, the amount of acid in the water being sufficient to give a separated liquid having a pH value of 5.2 to 5.9, adding a carotin decolorizing material precipitant belonging to the group consisting of ammonium sulfate and magnesium sulfate to the liquid whereby a precipitate is obtained, separating the precipitate thus produced from the liquid, and drying at a low temperature.

3. A process for the preparation of a concentrated carotin decolorizing material, which comprises treating a legume with acidulated water, separating solid and liquid, the amount of acid in the water being sufficient to give a separated liquid having a pH value of 5.2 to 5.9, adding ammonium sulfate to the liquid whereby a precipitate is obtained, separating the precipitate, and drying at a temperature upwards to 40° C.

4. A process for the preparation of a concentrated carotin decolorizing material, which comprises treating a legume with acidulated water, separating solid and liquid, the amount of acid in the water being sufficient to give a separated liquid having a pH value of 5.2 to 5.9, adding an alkali thereto until a pH of 6.5 to 7.0 is obtained, then adding ammonium sulfate to saturation whereby a precipitate is obtained, separating the precipitate from the liquid, and drying at a temperature less than 40° C.

5. A process for the preparation of a concentrated carotin decolorizing material, which comprises treating a legume with acidulated water, separating solid and liquid, the amount of acid in the water being sufficient to give a separated liquid having a pH value of 5.2 to 5.9, adding an alkali thereto until a pH of 6.5 to 7.0 is obtained, then adding ammonium sulfate to saturation whereby a precipitate is obtained, separating the precipitate from the liquid, dissolving the separated precipitate in water, dialyzing against running water, and evaporating at a temperature less than 40° C.

6. A process for the preparation of a concentrated carotin decolorizing material, which comprises treating soy bean flour with water acidulated with hydrochloric acid, separating solid and liquid, the amount of hydrochloric acid being sufficient to give to the separated liquid a pH value of about 5.5, adding sodium hydroxide thereto until a pH of 6.5 to 7.0 is obtained, then adding ammonium sulfate to saturation whereby a precipitate is obtained, separating the precipitate from the liquid, dissolving the separated precipitate in water, dialyzing against running water, and evaporating at a temperature less than 40° C.

7. A process for the manufacture of baked goods, which comprises incorporating with a dough batch containing flour, yeast, water and other dough ingredients, a concentrated carotin decolorizing material in the form of a crystalline-like product and prepared by treating an aqueous extract of a legume with a member of the group consisting of ammonium sulfate and magnesium sulfate whereby a precipitate of active material is obtained, separating the active material from liquid and drying at a low temperature, forming the mass into a dough, and subsequently baking.

8. A process for the manufacture of baked goods, which comprises incorporating with a dough batch containing flour, yeast, water and other dough ingredients, a concentrated carotin decolorizing material in the form of a crystalline-like product, having a potency five to twelve times that of an equal amount of soy bean flour and prepared by treating an aqueous extract of a legume with a member of the group consisting of ammonium sulfate and magnesium sulfate whereby a precipitate of active material is obtained, separating the active material from liquid and drying at a low temperature, forming the mass into a dough, and subsequently baking.

9. A process for decolorizing carotin coloring matter, which comprises treating carotin coloring matter with an active concentrated material in the form of a crystalline-like product having a potency substantially greater than an equal amount of soy bean flour and prepared by treating a legume with an acidulated aqueous solvent, separating solid from liquid, adding a carotin decolorizing material precipitant belonging to the group consisting of ammonium sulfate and magnesium sulfate whereby a precipitate of active material is obtained, separating the precipitate so produced, and drying at a temperature upwards to 40° C.

10. As a composition of matter, a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch.

11. As a composition of matter, a crystalline-like mass soluble in water and dilute inorganic acids, incapable when in solution of passing through a collodion membrane, brittle, inactivated at a temperature of about 100° C., having a strong decolorizing action on carotin; a potency substantially greater than an equal amount of soy bean flour, and a high activity in the decolorization of carotin in a dough batch.

12. As a composition of matter, a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch when included therein in an amount of from 0.025 to 0.1% based on the weight of the flour.

13. As a composition of matter, a crystalline-like mass soluble in water and dilute inorganic acids, incapable when in solution of passing through a collodion membrane, brittle, inactivated at a temperature of about 100° C., having a strong decolorizing action on carotin; a potency up to about twelve times that of an equal amount of soy bean flour, and a high activity in the decolorization of carotin in a dough batch.

14. A composition of matter containing ammonium sulfate, and a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch.

15. A composition of matter containing ammonium sulfate, starch, and a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch.

16. A composition of matter containing ammonium sulfate, a yeast innocuous calcium salt, a yeast innocuous oxidizing agent, and a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch.

17. A composition of matter containing ammonium sulfate, a yeast innocuous calcium salt, a bromate, and a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch.

18. As a composition of matter, a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch, said crystalline-like mass being produced by adding a carotin decolorizing material precipitant belonging to the group consisting of ammonium sulfate and magnesium sulfate to an aqueous extract of a legume, whereby a precipitate of active material is obtained, separating the active material from liquid, and drying at a low temperature.

19. A composition of matter containing ammonium sulfate, and a crystalline-like mass soluble in water and dilute inorganic acids, incapable when in solution of passing through a collodion membrane, brittle, inactivated at a temperature of about 100° C., having a strong decolorizing action on carotin, and being in concentrated form and of high activity in the decolorization of carotin in a dough batch, said crystalline-like mass being produced by adding ammonium sulfate to an aqueous extract of a legume, whereby a precipitate of active material is obtained, separating the active material from liquid, and drying at a low temperature.

JOHN D. GUTHRIE.